Jan. 23, 1968
R. R. HELLMAN
3,365,132
TEMPERATURE-RESPONSIVE ACTUATOR
Filed Dec. 15, 1965
2 Sheets-Sheet 1
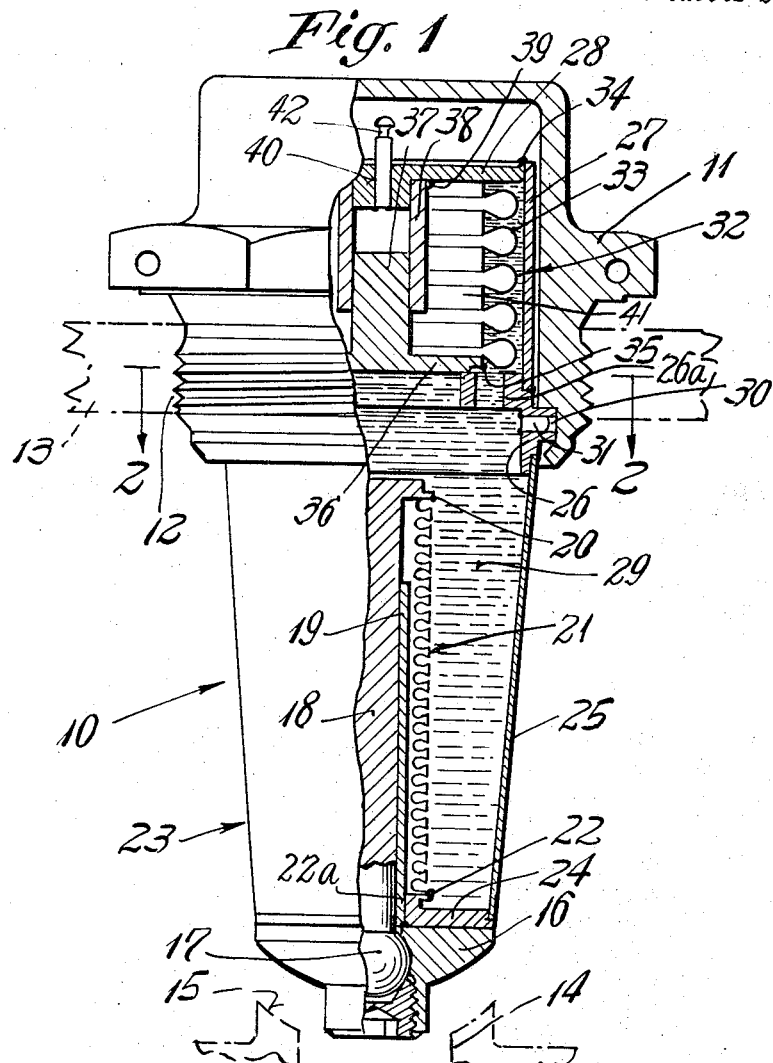
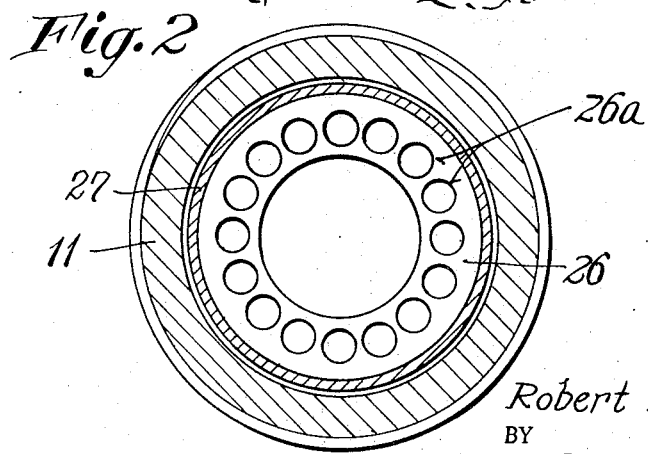
INVENTOR.
Robert R. Hellman
BY
Johnson and Kline
ATTORNEYS

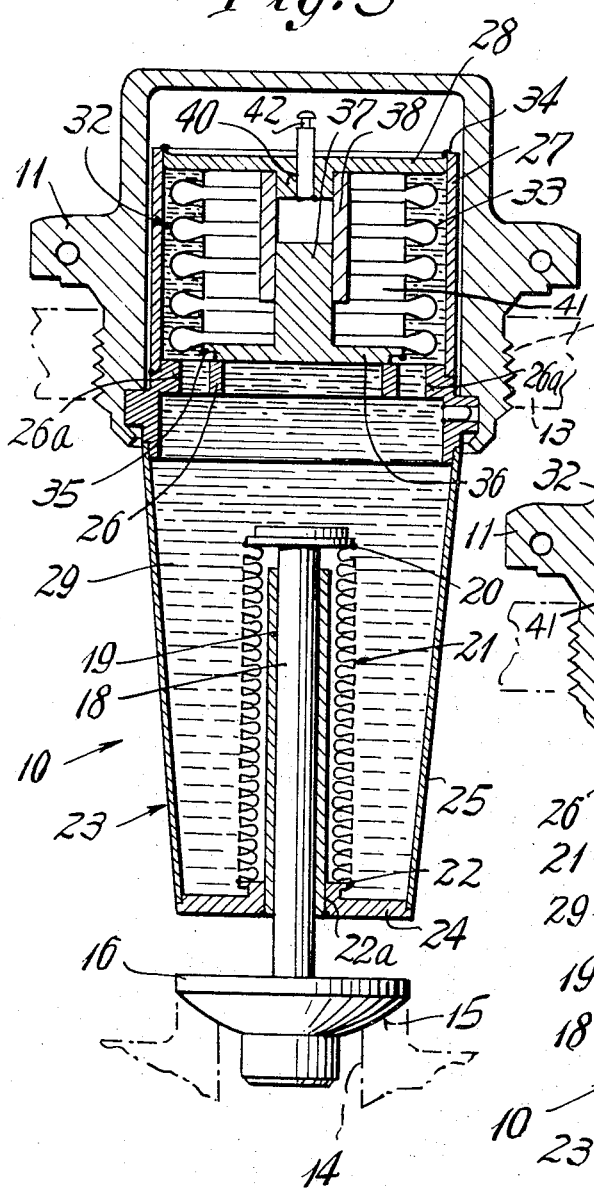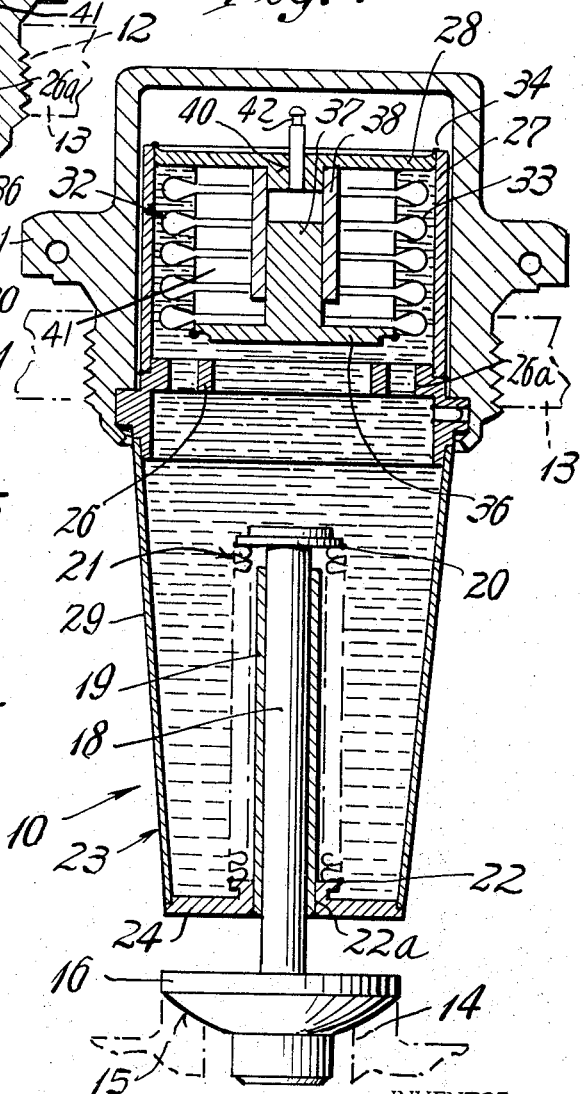

United States Patent Office 3,365,132
Patented Jan. 23, 1968

3,365,132
TEMPERATURE-RESPONSIVE ACTUATOR
Robert R. Hellman, Bridgeport, Conn., assignor to Westport Development & Manufacturing Company, Inc., Milford, Conn., a corporation of Connecticut
Filed Dec. 15, 1965, Ser. No. 513,965
7 Claims. (Cl. 236—93)

ABSTRACT OF THE DISCLOSURE

A temperature-responsive actuator for providing a movement of a piston that is related to temperature changing the volume of a fluid in a housing and in which excessive volumetric increase of the fluid is accommodated by increasing the space it may occupy in the housing by the pressure of the fluid reducing the volume of a displacement means in the housing.

---

One well-known use of the type of actuator to which the present invention relates is in the control of a valve in a hydraulic system with the valve operation being dependent upon the temperature of the fluid in the system. While thermally responsive valve actuators have heretofore been suggested, they have not been found completely satisfactory. Normally each contains a fluid which expands with temperature rise with the expansion being used to provide motion or force. The actuators are made relatively sensitive to temperature within their range and thus when the maximum temperature of the range has been achieved, the increase in volume has caused the actuators to have completed their movement. When, as many times occurs, the temperature of the fluid increases beyond the maximum of its operating range, difficulties have arisen with attempts to accommodate the volume increase caused thereby to prevent it from causing structural changes. However, such attempts have not been completely successful and thus structural changes have caused altering of the calibration or the relationship between the temperature and the displacement of the actuator. If the change was minor, it rendered the actuator unsuitable for its intended purpose and if drastic, it completely destroyed its operating ability.

It is accordingly an object of the present invention to provide a temperature-responsive actuator which effectively accommodates over-expansion and maintains its calibration even after being subjected many times to temperatures substantially beyond its normal operating range.

Another object of the present invention is to provide a temperature-responsive actuator which is both sensitive and accurately responsive to temperature changes even after an extended period of use and which is capable of exerting a large force and/or producing a relatively long motion.

A further object of the present invention is to provide a temperature-responsive actuator which achieves the above objects, yet which is extremely simple in construction, compact, relatively economical to manufacture and which may be readily constructed for use under different conditions of operation.

A feature of the present invention resides in providing a temperature-responsive actuator which has a sealed housing that is completely filled with a fluid, such as oil. The housing and the fluid are in intimate contact to have their temperatures be substantially identical while the exterior of the housing is subjected to the temperature to which the actuator is to be responsive. The housing has a constant volume and when the fluid increases in volume as its temperature increases, the increase in volume is employed to move a piston that produces the motion of the actuator. The piston is secured to the free end of a bellows secured in an opening in the housing and the latter by its contraction effectively increases the volume of the housing to accommodate the increase in volume of the fluid.

The movement of the piston is limited and if the temperature of the housing fluid continues to increase, the present invention provides for a resilient displacement means which becomes actuated when the housing fluid attains a preselected pressure. Thus the increase in volume of the housing fluid will, after a selected pressure, begin collapsing of the displacement means to thereby enlarge the volume in the housing which the housing fluid may occupy. Specifically the resilient displacement means consists of a gas filled cylinder having closed ends and a side wall which is axially resilient with the gas being under a predetermined pressure. The free ends of the displacement means are much larger than the end of the piston and thus only small pressures above its initial collapsing pressure provide a relatively large volume of displacement which prevents the housing fluid from reaching a detrimental pressure even with a substantial temperature rise.

Other features and advantages will hereinafter appear.

In the drawing:

FIGURE 1 is a view of the temperature-responsive actuator of the present invention, partly in section, with the parts shown in the position they occupied when the actuator is at a temperature below the operating range thereof.

FIG. 2 is a section taken on the line 2—2 of FIG. 1.

FIG. 3 is an axial section of the actuator with the parts shown as they would be positioned when the actuator is at its maximum operating temperature.

FIG. 4 is a naxial section showing the position of the parts when the actuator is subjected to a temperature, i.e. an overtemperature which is higher than its maximum operating temperature.

Referring to the drawing, the actuator is generally indicated by the reference numeral 10 and includes a threaded cover 11 by which the actuator may be mounted, for example, in a threaded opening 12 of a hydraulic conduit 13. The conduit 13 has an outlet 14 formed to provide with a valve seat 15 such that the actuator 10 is adapted, in the specific embodiment shown, to close the opening 14 upon the temperature of a medium within the pipe 13 achieving a preselected temperature.

The valve seat 15 is engaged by a stopper 16 swivelly carried as by use of a ball joint 17 on an end of a piston 18 that is slidable within a tubular guide 19. The other end of the piston is fixed as by welding 20 to one end of an elongate, axially resilient bellows 21. The other end of the bellows is secured as at 22 to an opening 22a in a hollow housing, generally indicated by the reference numeral 23. The housing is formed by a cap 24, a frusto-conical side wall 25, an annular flange 26, a tubular portion 27 and a head 28. The housing parts are preferably formed of metal that are welded together and as the piston is welded to the bellows 21 and the latter to the cap 24, there is formed a hermetically sealed enclosure having a definite volume.

The interior of the housing 23 is completely filled with a fluid 29, specifically a liquid as oil, having a known temperature coefficient of expansion. The fluid is introduced through an opening 30 formed in the flange 26 with the opening being subsequently closed as by a plug 31. As will be hereafter appreciated the specific type of fluid used will depend on the characteristics which the actuator is desired to have and may be one which maintains its liquid state at all temperatures to which it is anticipated to be subjected.

Also contained within the housing is a resilient displacement means, generally indicated by the reference numeral 32. Said means includes a length of annularly corrugated tubing 33 having one end fixed as at 34 to the interior of the head 28 and its other end welded as at 35 to an end 36. The end 36 includes a cylindrical portion 37 telescopingly contained within a guide tube 38, the latter being fixed as at 39 to the head 28. A conduit 40 extends through the head to enable a fluid 41 to be introduced into the interior of a displacement means to occupy the sealed space defined by the end 36, the corrugated tubing 33 and the interior of the head 28. After filling the tube 40 is closed by pinching or welding as at 42.

The annular flange 26 extends inwardly in the housing and is positioned to be abutted by the end 36 to thereby mechanically limit the expansive urgings of the displacement means. Flange 26 includes holes 26a that facilitate the filling of the space between the exterior of the corrugated tubing 33 and tubular portion 26 by the fluid 29 when it is introduced into the housing.

The temperature-responsive actuator of the present invention is designed or calibrated by the selection of the fluid 29 and the size of the various parts to cause the piston to move a specific linear distance from its retracted position (FIG. 1) to its extended position (FIG. 2) when the temperature of the fluid 29 increases from a minimum operating value to a maximum operating value. Between the minimum and maximum values, proportional relationships substantially occur. The temperature of the fluid 29 conforms substantially in value to the temperature of the medium within the pipe 13 to which it is thus responsive. The piston assumes its retracted position when the temperature of the fluid 29 is less than the minimum of its operating range and its retractive movement is mechanically limited by the stopper 15 engaging the cap 24. The bellows 21 is at the maximum retractive position preferably somewhat compressed.

In the operation of the actuator when the temperature of the fluid 29 increases beyond its minimum operating value its volume increases and the increased volume will increase the pressure within the housing. The fluid pressure then overcomes the natural resistance to axial collapsing of the bellows 21 which will collapse as the fluid 29 temperature increase. At the maximum operating temperature, the fluid has expanded sufficiently to cause the piston to achieve its maximum extended position. Further movement of the piston is mechanically prevented by it engaging the end of the guide tube 18 as shown in FIG. 3. The piston will move between its two mechanically stopped positions in response to the temperature of the fluid 29 changing within its operating range. The bellows 21 is designed to be capable of being axially compressed between the two piston positions without permanent deformation or change in its operating characteristics.

While it is preferred that the temperature of the fluid 29 be maintained within its operating temperatures, in many applications its temperature is caused to greatly exceed the temperature required for maximum outward movement of the piston. For example one application required operating temperature values of 35±2° and 52±2° F. for fully retracted and extended positions respectively and yet the actuator also had to be capable of tolerating temperatures between −65° and +300° F. without a change in its operational characteristics. In accordance with the present invention as the temperature of the fluid 29 increases beyond its maximum operating temperature, it tends to increase its volume but the increase in volume is initially prevented so its pressure increases. The increase continues until it attains a value which is substantially equal to the pressure of the fluid 41 and the spring rate of the tubing 33 of the displacement means 32. As the temperature of the fluid 29 further increases, its increasing pressure will cause a collapsing of the displacement means 32 until the pressures of the fluids 29 and 41 are substantially balanced and the balance will be maintained during the overtemperature operation. The displacement means by collapsing will increase the volume which the fluid 29 may occupy and accordingly control the pressure exerted thereby.

It will be understood that the pressure required to fully extend the piston as shown in FIG. 3 has a definite value which is related to the area of the end of the piston, the force which the piston is to provide, and the spring rate of the bellows 21. The pressure of the fluid within the displacement means and the spring rate of the displacement means is greater than such a value so that during normal operation there is no volumetric change caused by the displacement means.

It will be appreciated that the free end of the piston is of relatively small diameter as compared to the area of the movable end of the displacement means. Thus small changes in temperature will produce a relatively large movement of the piston thereby rendering the actuator extremely sensitive to temperature. Large increases in temperature on the other hand will only produce small changes in pressure of the fluid 29 as a small collapsing of the displacement means will produce a relatively large increase in the volume of the housing to accommodate the increase in volume of the fluid 29. Accordingly, while there may be substantial changes in the temperature of the fluid 29, the pressure of both the fluid 29 and the fluid 41 will not vary substantially above their initial pressure and in this way extremely large overtemperatures may be accommodated without distortion of the bellows 21 which could cause it to lose its calibration and/or prevent its functioning.

The size of the displacement means with respect to the quantity of fluid 29 may of course be easily varied to minimize the overpressure.

When the temperature of the fluid 29 decreases, the displacement means initially returns to its original condition prior to the piston being retracted, the latter being effected primarily by the expansive urgings of the compressed bellows 19.

The force exerted by the piston when extended is dependent on the pressure of the fluid 29 and its value is maintained at least at or above the minimum desired value by the displacement means being made not capable of collapsing until a greater value of pressure than that required is effected.

Variations and modifications may be made within the scope of the claims and portions of the improvements may be used without others.

I claim:

1. A temperature-responsive actuator comprising an enclosed housing having an opening, an axially resilient elongate bellows having one end sealingly secured to said housing at said opening and having a free end, a piston secured to the exterior of the free end for movement therewith, a fluid filling said housing, said fluid having a positive temperature coefficient of expansion, said fluid engaging the interior of the free end of the bellows and causing displacement thereof with volumetric changes caused by temperature changes, a hollow and sealed displacement means positioned in said housing and having a free end and axially resilient sides, and a gas under pressure contained within the displacement means, said displacement means being mechanically independent of the piston and bellows and having its free end contacted by said fluid to be solely responsive collapsibly to the pressure of the fluid.

2. The invention as defined in claim 1 in which the gas in said displacement means under pressure has a pressure greater than the pressure of the fluid in the housing required to move said free end of the bellows, whereby said displacement means is prevented from collapsing until the free end has moved.

3. The invention as defined in claim 1 in which the free end of the bellows has a relatively small area and the free end of said displacement means has a relatively large area and is subjected to the pressure of the fluid, whereby said displacement means provides a relatively large volumetric change for small changes in pressure of the fluid above the pressure required to collapse the displacement means.

4. The invention as defined in claim 1 in which there are means for limiting the outward movement of the free end, said free end engaging said means upon the fluid achieving a selected pressure and the gas in said displacement means being at a pressure which resists collapsing until the housing fluid achieves at least the selected pressure.

5. The invention as defined in claim 1 in which there are means in said housing for limiting the expansion of the displacement means to maintain a constant maximum volume thereof.

6. The invention as defined in claim 1 in which the piston is elongate having a working end, valve means, and means swivelly securing said valve means on said working end, whereby said valve means may swivel with respect to the axis of the piston.

7. The invention as defined in claim 1 in which there are conduit means communicating with the interior of the displacement means and means for sealing said conduit upon introduction of the gas therein with said gas being introduced after the positioning of the displacement means in the housing.

References Cited
UNITED STATES PATENTS

| | | | |
|---|---|---|---|
| 1,694,641 | 12/1928 | Crosby | 236—56 |
| 1,752,116 | 3/1930 | Smith | 236—34.5 |
| 2,142,442 | 1/1939 | Giesler | 236—34 |
| 2,203,153 | 6/1940 | Johnson | 236—99 |

EDWARD J. MICHAEL, *Primary Examiner.*